US012748004B2

(12) United States Patent
Rieger et al.

(10) Patent No.: US 12,748,004 B2
(45) Date of Patent: Sep. 29, 2026

(54) DEVICE FOR REGISTERING THE BRAKE APPLICATION FORCES BETWEEN A BRAKE MEMBER AND A BRAKE ROTOR OF A DISC OR DRUM BRAKE

(71) Applicant: NET-Automation GmbH, St. Peter ob Judenburg (AT)

(72) Inventors: Walter Rieger, St. Peter ob Judenburg (AT); Gernot Theuermann, St. Peter ob Judenburg (AT); Christian Zuber, St. Peter ob Judenburg (AT)

( * ) Notice: Subject to any disclaimer, the term of this patent is extended or adjusted under 35 U.S.C. 154(b) by 371 days.

(21) Appl. No.: 18/692,587

(22) PCT Filed: Jul. 26, 2022

(86) PCT No.: PCT/AT2022/060267
§ 371 (c)(1),
(2) Date: Mar. 15, 2024

(87) PCT Pub. No.: WO2023/039621
PCT Pub. Date: Mar. 23, 2023

(65) Prior Publication Data
US 2024/0384769 A1 Nov. 21, 2024

(30) Foreign Application Priority Data
Sep. 15, 2021 (AT) .............................. A 50727/2021

(51) Int. Cl.
*G01L 5/28* (2006.01)
*G01L 1/18* (2006.01)
*F16D 66/00* (2006.01)

(52) U.S. Cl.
CPC ................ *G01L 5/288* (2013.01); *G01L 1/18* (2013.01); *G01L 5/28* (2013.01); *F16D 2066/005* (2013.01)

(58) Field of Classification Search
CPC ........ F16D 66/00; F16D 66/02; F16D 66/021; F16D 2066/005; G01L 5/28
See application file for complete search history.

(56) References Cited

U.S. PATENT DOCUMENTS 6,302,241 B1 * 10/2001 Gronowicz, Jr. ..... B60T 17/221 188/1.11 W
6,384,721 B1 * 5/2002 Paielli ..................... F16D 66/02 188/1.11 R (Continued)

FOREIGN PATENT DOCUMENTS

CN 208736580 U 4/2019
DE 10101973 A1 8/2002

(Continued)

OTHER PUBLICATIONS

English language espacenet Abstract for CN 208736580 U, Apr. 12, 2019.

(Continued)

*Primary Examiner* — Eric S. McCall
(74) *Attorney, Agent, or Firm* — Tiajoloff & Kelly LLP

(57) ABSTRACT

An apparatus for detecting the clamping forces between a brake body (1) and a brake rotor (2) of a disc brake or drum brake comprises a multi-layer measuring film (3) that can be inserted between the brake body (1) and the brake rotor (2) and which multi-layer measuring film (3) comprises a sensor layer (6) with pressure-dependent changing electrical properties and two electrically conductive layers (7) connected to an evaluation device (5). For assignment of the determined clamping forces to the area of the sensor layer (6) exposed to the respective pressurization, the measuring film (3) has two electrode layers (8) connected to the evaluation device (5) for determining the film capacitance between the electrode layers (8).

6 Claims, 1 Drawing Sheet

(56) References Cited

U.S. PATENT DOCUMENTS

Figure 1:
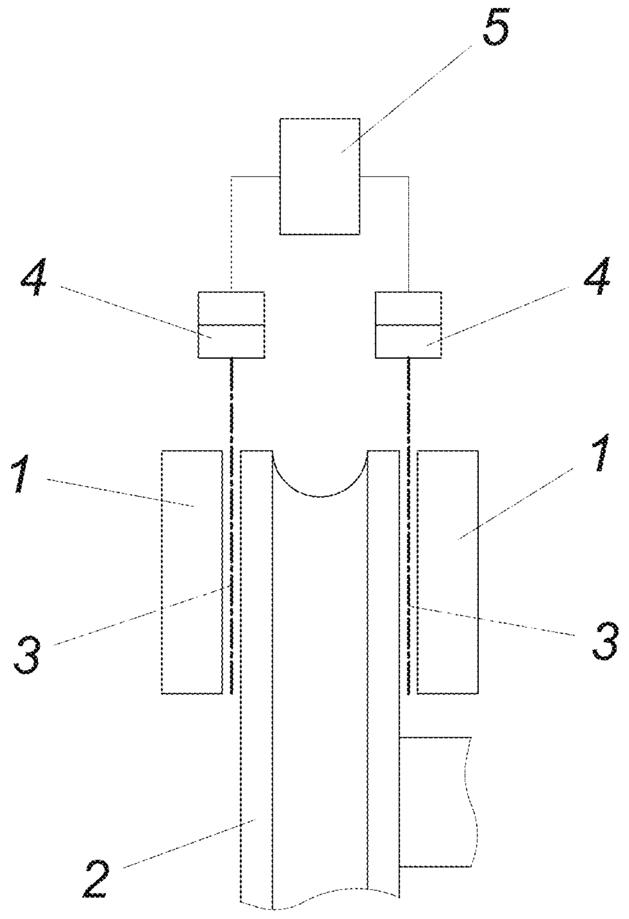

| | | | |
|---|---|---|---|
| 7,395,717 | B2 | 7/2008 | DeAngelis et al. |
| 7,578,195 | B2 | 8/2009 | DeAngelis et al. |
| 9,415,757 | B2 | 8/2016 | Martinotto et al. |
| 9,964,167 | B2 | 5/2018 | Martinotto et al. |
| 10,119,586 | B2 | 11/2018 | Merlo et al. |
| 10,598,239 | B2 | 3/2020 | Martinotto et al. |
| 10,934,639 | B2 | 3/2021 | Horter et al. |
| 11,519,474 | B2 | 12/2022 | Merlo et al. |
| 11,767,896 | B2 | 9/2023 | Martinotto et al. |
| 2006/0254868 | A1 | 11/2006 | Thiesing et al. |
| 2007/0248799 | A1 | 10/2007 | DeAngelis et al. |
| 2008/0127739 | A1 | 6/2008 | DeAngelis et al. |
| 2014/0311833 | A1 | 10/2014 | Martinotto et al. |
| 2016/0084331 | A1 | 3/2016 | Merlo et al. |
| 2017/0030424 | A1 | 2/2017 | Martinotto et al. |
| 2018/0306262 | A1 | 10/2018 | Martinotto et al. |
| 2019/0024269 | A1 | 1/2019 | Horter et al. |
| 2019/0178322 | A1 | 6/2019 | Merlo et al. |
| 2021/0148427 | A1 | 5/2021 | Martinotto et al. |
| 2023/0228631 | A1* | 7/2023 | Serra .................... F16D 65/092 188/251 R |

FOREIGN PATENT DOCUMENTS

| | | | |
|---|---|---|---|
| DE | 10 2006 018 952 | A1 | 10/2007 |
| DE | 112007000350 | | 12/2008 |
| DE | 102016106071 | A1 | 10/2017 |
| EP | 3722768 | A1 | 10/2020 |
| JP | 2007224988 | A | 9/2007 |
| WO | 2005/015045 | | 2/2005 |
| WO | 2007/094993 | | 8/2007 |
| WO | 2014/170726 | | 10/2014 |

OTHER PUBLICATIONS

English language espacenet Abstract for DE 10101973 A1, Aug. 1, 2002.

English language espacenet Abstract for DE 10 2006 018 952 A1, Oct. 25, 2007.

* cited by examiner

DEVICE FOR REGISTERING THE BRAKE APPLICATION FORCES BETWEEN A BRAKE MEMBER AND A BRAKE ROTOR OF A DISC OR DRUM BRAKE

FIELD OF THE INVENTION

The invention relates to an apparatus for detecting the clamping forces between a brake body and a brake rotor of a disc brake or drum brake, comprising a multi-layer measuring film which can be inserted between the brake body and the brake rotor and which multi-layer measuring film comprises a sensor layer with pressure-dependent changing electrical properties and two electrically conductive layers connected to an evaluation device.

DESCRIPTION OF THE PRIOR ART

In order to detect the braking forces occurring during vehicle braking, it is known in disc brakes (DE 10 2006 018 952 A1, WO 2014/170726 A1) to provide force transducers based on piezo elements connected to an electrical evaluation device between the brake pads and the brake pad carriers. However, the disadvantage is that these force transducers must be taken into account in the design of the disc brakes and, due to the use of piezo elements, are suitable for detecting braking forces that become effective during vehicle braking, but not for detecting static clamping forces.

To determine the clamping forces acting on disc brakes or drum brakes, it is already known (WO 2005/015045 A1) to use force transducers whose electrical resistance changes with the application pressure. Such force transducers can in turn be provided between the brake bodies interacting with a brake disc or a brake drum and the brake body carriers. However, it is also possible to use the brake body itself as a sensor with pressure-dependent changing electrical resistance values instead of such a force transducer. However, the provision of a corresponding sensor or sensor layer must be taken into account in the design of the disc brake or drum brake, so that the clamping forces can only be detected in appropriately equipped disc brakes or drum brakes.

Finally, to determine the clamping forces of a disc brake or drum brake, it is known (EP 3 722 768 A1) to insert a multi-layer measuring film consisting of a sensor layer with pressure-dependent changing electrical properties between the brake body and the brake rotor. With the aid of two electrically conductive layers, the pressure-dependent changing electrical measurement signal is tapped and fed to an evaluation device in which the clamping forces occurring are determined based on the known pressure dependence of the electrical measurement signal. A disadvantage, however, is that the clamping forces must be related to the area of the sensor layer, so that if the sensor film is only partially pressurized, for example due to manufacturing tolerances or wear, the clamping forces determined are too small.

In addition, a sensor arrangement is known (DE 102016106071 A1), with the aid of which the location of the force or pressure applied can be determined with spatial resolution and the amount of the force or pressure applied can also be detected. For this purpose, the sensor arrangement comprises two layers of fabric separated from each other by a middle layer, which form two mutually perpendicular pairs of parallel, electrically insulated conductors. This results in a grid of intersecting conductors that are electrically contacted through the middle layer when a force occurs in an intersection area, so that the two conductors that are contacted as a result of the force and run perpendicular to each other determine the contacting point. The middle layer, for which a film material can alternatively be used instead of a fabric material, can form a dielectric made of a non-electrically conductive material, resulting in a capacitive sensor arrangement in the manner of a plate capacitor. However, the middle layer can also have a piezoelectric material for a piezoelectric sensor arrangement or an electrically conductive material whose electrical resistance changes when force or pressure is applied, so that a resistive or piezoresistive sensor arrangement is formed. However, due to the locally limited measuring ranges determined by the crossing points of the electrical conductors of the outer fabric layers, such a sensor arrangement is unsuitable for detecting the clamping forces of a brake distributed over a braking surface.

SUMMARY OF THE INVENTION

The invention is therefore based on the task of creating simple, constructive conditions in order to be able to detect the clamping forces acting between a brake body and a brake rotor of a disc brake or drum brake more accurately.

Based on an apparatus of the type described at the beginning, the invention solves the task set in that the measuring film has two electrode layers connected to the evaluation device for determining the film capacitance between the electrode layers in order to assign the determined clamping forces to the area of the sensor layer exposed to the respective pressurization.

If the brake body does not act over the entire surface of the brake rotor of a disc brake or drum brake, this means that different distances are effective between the brake body and the brake rotor, which influence the capacitance of the measuring film clamped between the brake body and the brake rotor, so that the contact surface can also be determined with a corresponding capacitance measurement in order to be able to relate the clamping forces recorded with the aid of the sensor layer to this contact surface. The measuring film therefore only needs to be provided with two electrode layers connected to the evaluation device to determine the film capacitance, which is then used to draw conclusions about the respective contact surface between the brake body and brake rotor, so that the evaluation device reproduces the clamping forces as a function of the respective contact surface.

A piezoresistive layer whose specific electrical resistance changes under the effect of a mechanical stress caused by a pressure load on the piezoresistive layer material is particularly suitable as a sensor layer. Appropriately doped semiconductors, e.g. based on silicon or germanium or III-V semiconductors, are advantageously suitable as a sensor layer.

BRIEF DESCRIPTION OF THE INVENTION

Figure 2:
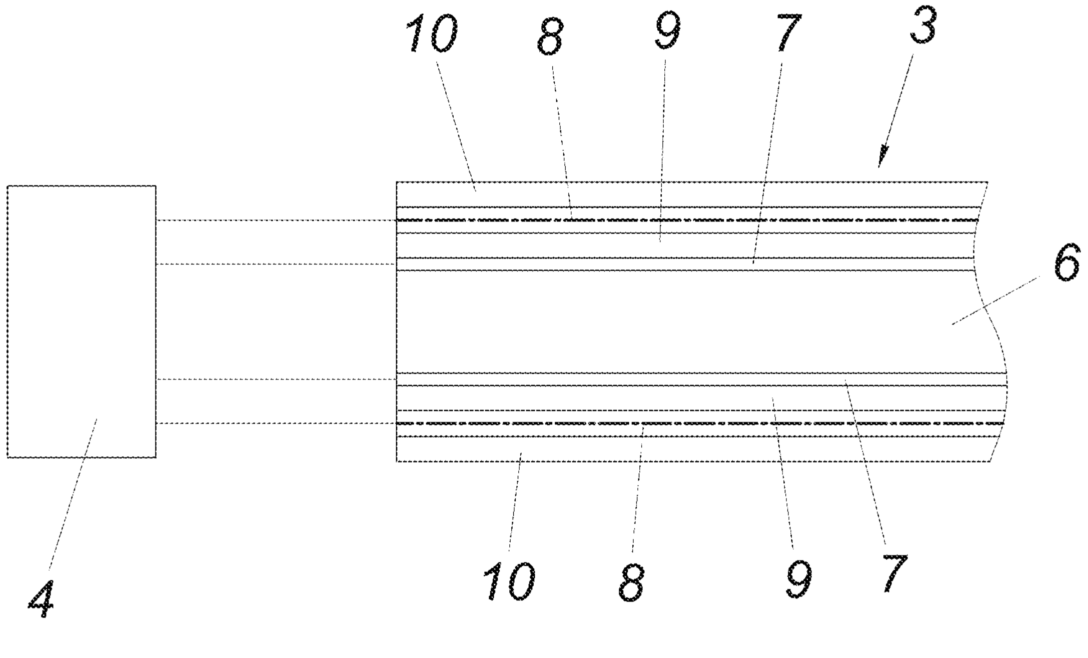

The drawing shows an example of the subject matter of the invention, wherein:

FIG. 1 shows an apparatus according to the invention in a schematic block diagram and FIG. 2 shows a schematic layer structure of a multilayer measuring film according to the invention.

DETAILED DESCRIPTION OF THE PREFERRED EMBODIMENT

An apparatus according to the invention for detecting the clamping forces between a brake body 1 and a brake rotor 2 of a brake, indicated in the embodiment example as a disc brake, comprises a multi-layer measuring film 3 according to FIG. 1, which is electrically connected to an evaluation device 5 by a plug-in coupling 4. The evaluation device is preferably used not only to evaluate the measurement signals of the measuring film 3, but also to apply electrical energy to the measuring film.

According to FIG. 2, the multi-layer measuring film 3 has a sensor layer 6 made of a material whose electrical properties change with the application pressure, as is particularly the case for piezoresistive materials. The sensor layer 6 is arranged between two electrically conductive layers 7, via which an electrical measuring voltage can be applied to the piezoresistive sensor layer 6. As the specific electrical resistance of the sensor layer 6 changes with the application pressure, the pressure load on the sensor layer 6 and thus the magnitude of the acting forces can be deduced from the magnitude of the electric current flowing through the sensor layer 6 due to the given pressure dependence of the specific electrical resistance. The area of the sensor layer 6 is predetermined by the design and is therefore known.

However, the prerequisite for a corresponding measurement result is that the application pressure is distributed evenly over the surface of the sensor layer 6, which, however, cannot generally be assumed. In order to be able to estimate the size of an area of the sensor layer 6 exposed to pressure, a capacitance measurement is also carried out between two electrode layers 8, which cover the electrically conductive layers 7 with an insulating layer 9 in between. Additional cover layers 10 can be provided to protect the measuring film 3.

Since the film capacitance depends on the respective area that is exposed to the pressure between the brake body 1 and the brake rotor 2, such a capacitance measurement can be used to draw conclusions about the area of the sensor layer 6 that is exposed to the clamping forces, which allows the determined clamping forces to be assigned to the area of the sensor layer 6 exposed to the respective pressure.

The additional capacitance measurement, for which two separate electrode layers 8 do not necessarily have to be provided because one of the electrically conductive layers 7 can also be used as an electrode layer for the capacitance measurement, does not increase the handling effort. It is only necessary to insert the measuring film 3 into the gap between brake body 1 and brake rotor 2 and hold it in place on the brake rotor 2 or brake body 1 before connecting the measuring film 3 to an evaluation device 5 by means of the plug-in coupling 4 and starting the measurement after the brake has been applied.

The connection between the measuring film 3 and the evaluation device 5 can of course also be wireless, just as it is also possible to combine the evaluation device 5 with the measuring film 3 to form a single unit.

The invention claimed is:

1. An apparatus for detecting clamping forces between a brake body and a brake rotor of a disc brake or drum brake, said apparatus comprising:

a multi-layer measuring film configured to be inserted between the brake body and the brake rotor, said multi-layer measuring film comprising a sensor layer with pressure-dependent changing electrical properties, said sensor layer having two electrically conductive layers connected to an evaluation device;

wherein the measuring film has two electrode layers connected to the evaluation device, which determines film capacitance between the electrode layers so as to assign clamping forces determined from the sensor layer to an area of the sensor layer exposed to pressurization.

2. The apparatus according to claim 1, wherein the sensor layer is a piezoresistive layer.

3. In an apparatus having a brake body and a brake rotor of a disc brake or drum brake, the improvement comprising:

a multi-layer measuring film inserted between the brake body and the brake rotor;

said multi-layer measuring film including a sensor layer with a pressure-dependent changing electrical property;

said sensor layer having two electrically conductive layers connected to an evaluation device such that the evaluation device determines clamping forces between the brake body and the brake rotor from the electrical property of the sensor layer; and two electrode layers connected to the evaluation device, the evaluation device determining film capacitance between the electrode layers and therefrom a magnitude of an area of the sensor layer that is exposed to pressurization from the clamping forces between the brake body and the brake rotor.

4. The invention according to claim 3, wherein the sensor layer comprises a piezoresistive layer.

5. An apparatus comprising:

a brake body and a brake rotor of a disc brake or drum brake supported so as to be pressed together; and a multi-layer measuring film inserted between the brake body and the brake rotor;

said multi-layer measuring film including a sensor layer with a pressure-dependent changing electrical property;

said sensor layer having two electrically conductive layers connected with an evaluation device such that the evaluation device determines clamping forces between the brake body and the brake rotor from the electrical properties of the sensor layer affected by the clamping forces; and two electrode layers connected to the evaluation device, the evaluation device determining film capacitance between the electrode layers and determining therefrom an area of the sensor layer that is exposed to pressurization from the clamping forces between the brake body and the brake rotor.

6. The invention according to claim 5, wherein the sensor layer comprises a piezoresistive layer.

* * * * *